(12) United States Patent
Toda et al.

(10) Patent No.: US 8,932,506 B2
(45) Date of Patent: Jan. 13, 2015

(54) RESIN INJECTION MOLDING METHOD

(75) Inventors: Naoki Toda, Nagoya (JP); Satoshi Imaeda, Nagoya (JP); Takeshi Yamaguchi, Nagoya (JP); Toshihiko Kariya, Nagoya (JP)

(73) Assignee: Mitsubishi Heavy Industries Plastic Technology, Nagoya-shi (JP)

( * ) Notice: Subject to any disclaimer, the term of this patent is extended or adjusted under 35 U.S.C. 154(b) by 152 days.

(21) Appl. No.: 13/503,935

(22) PCT Filed: Apr. 7, 2010

(86) PCT No.: PCT/JP2010/002533
§ 371 (c)(1),
(2), (4) Date: Apr. 25, 2012

(87) PCT Pub. No.: WO2011/125121
PCT Pub. Date: Oct. 13, 2011

(65) Prior Publication Data
US 2012/0211921 A1    Aug. 23, 2012

(51) Int. Cl.
*B29C 45/46* (2006.01)
*B29C 45/00* (2006.01)

(52) U.S. Cl.
CPC ... *B29C 45/0046* (2013.01); *B29C 2945/76133* (2013.01); *B29K 2995/0041* (2013.01)
USPC ............... 264/328.8; 264/328.12; 264/328.16

(58) Field of Classification Search
CPC ................. B29C 2945/76133; B29C 45/0046; B29C 45/0025; B29C 2045/7356; B29C 2945/76618; B29C 2045/0039
USPC .................. 264/328.1, 328.8, 328.12, 328.16
See application file for complete search history.

(56) References Cited

U.S. PATENT DOCUMENTS

| | | | | |
|---|---|---|---|---|
| 2,182,389 A | * | 12/1939 | Reid | 264/279 |
| 2,360,023 A | * | 10/1944 | Tucker | 249/78 |
| 5,314,326 A | * | 5/1994 | Furugohri et al. | 425/573 |
| 5,484,563 A | * | 1/1996 | Miyazaki et al. | 264/69 |
| 5,656,228 A | * | 8/1997 | Fujii et al. | 264/328.13 |

(Continued)

FOREIGN PATENT DOCUMENTS

EP    0 508 732 A2    10/1992
JP    06-064002 A    3/1994

(Continued)

OTHER PUBLICATIONS

Electronic translation of Japanese refernce 07-276410.*

(Continued)

*Primary Examiner* — Jill Heitbrink
(74) *Attorney, Agent, or Firm* — Westerman, Hattori, Daniels & Adrian, LLP

(57) ABSTRACT

The resin injection molding method of the present invention is a method for molding resins inside a cavity formed within a mold. The method comprises injecting resins into the cavity through a plurality of paths installed so as to be openable and closable and optionally maintaining the resin inside the cavity at a pressure; closing each of the plurality of paths such that the resins injected from each path converge, there being a time difference between when a first path and a second path of the plurality of paths are closed; and solidifying at least the resin which is injected from the path closed earliest with a crystallinity greater than or equal to a predetermined crystallinity degree.

22 Claims, 8 Drawing Sheets

(56) References Cited

U.S. PATENT DOCUMENTS

| | | | |
|---|---|---|---|
| 5,851,474 A * | 12/1998 | Allan et al. | 264/403 |
| 6,290,882 B1 * | 9/2001 | Maus et al. | 264/2.2 |
| 6,596,370 B2 * | 7/2003 | Hyuga et al. | 428/66.6 |
| 2001/0028949 A1 * | 10/2001 | Togawa et al. | 428/297.4 |

FOREIGN PATENT DOCUMENTS

| | | | |
|---|---|---|---|
| JP | 07-276410 | * | 10/1995 |
| JP | 07-276410 A | | 10/1995 |
| JP | 2002-292682 A | | 10/2002 |
| JP | 2003-117945 A | | 4/2003 |
| JP | 3859620 B2 | | 12/2006 |
| JP | 3999486 B2 | | 10/2007 |
| JP | 2008-044384 A | | 2/2008 |
| JP | 2008-100367 A | | 5/2008 |
| JP | 2009-190386 A | | 8/2009 |

OTHER PUBLICATIONS

Tripathi, "Practical Guide to Polypropylene", RAPRA Technology LTD., 2002, pp. 19-22.*
International Search Report of PCT/JP2010/002533, dated Jun. 22, 2010.
Written Opinion of PCT/JP2010/002533, dated Jun. 22, 2010.
Chinese Office Action dated Jan. 24, 2014, issued in Chinese Patent Application No. 201080048271.4, w/partial English translation (12 pages).

* cited by examiner

RESIN INJECTION MOLDING METHOD

TECHNICAL FIELD

The present invention relates to a resin injection molding method in which resins are supplied into a cavity from a plurality of paths to cause the resins to converge from these paths, thereby molding the resins and, in particular, to a resin injection molding method for suppress the appearance of a boundary line that is visibly recognized at a converged portion of the resins.

BACKGROUND ART

In an injection molding for injecting and filling a resin into a cavity inside a mold from a gate, where the cavity shape is complicated geometrically, a technique is used for providing a plurality of gates and feeding resins into the cavity from the individual gates so that the resins can be delivered into corners of the cavity. Where the resins are caused to converge from the plurality of gates as described above, a groove which is called a weld occurs on the surface of a shaped article at the converged portion of the resins. This causes the disfigurement of the shaped article.

As means for preventing occurrence of the weld, there has been so far proposed a resin injection molding method in which a mold is heated to raise a mold temperature on injection and filling of a resin to a temperature greater than or equal to a glass transition temperature and a heat distortion temperature where the resin is non-crystalline, and to a temperature greater than or equal to the melting point where the resin is crystalline (for example, refer to Patent Document 1). According to the above-described injection molding method, since resins converge at a converged portion in a molten state which is higher in temperature, the resins are solidified in such a state to be sufficiently pressed to the mold. Thereby, the groove depth of the weld can be completely eliminated at the converged portion. Alternatively, the weld can be made shallow so as to suppress the appearance thereof.

PRIOR ART DOCUMENT

Patent Document

Patent Document 1: Japanese Patent No. 3859620

SUMMARY OF THE INVENTION

Problems to be Solved by the Invention

However, according to a conventional injection molding method, there is a case that a boundary line is visibly recognized at a converged portion of resins although no weld actually forms at all at the converged portion. This boundary line is considered to occur due to a difference in gloss of a shaped article or reflection properties of light at the converged portion as a border. Then, in an appearance-conscious shaped article, there is a demand for suppressing occurrence even for this type of boundary line.

The present invention has been made in view of the above situation, an object of which is to provide means for suppressing occurrence of a boundary line at a converged portion of resins in a resin injection molding method in which the resins injected from a plurality of gates are caused to converge inside a cavity.

Means for Solving the Problems

In order to achieve the above-described object, the present invention has adopted the following means. That is, the resin injection molding method of the present invention is a method for molding resins inside a cavity formed within a mold. The method comprises injecting resins into the cavity through a plurality of paths installed so as to be openable and closable and optionally maintaining the resin inside the cavity at a pressure; closing each of the plurality of paths such that the resins injected from each path converge, there being a time difference between when a first path and a second path of the plurality of paths are closed; and solidifying at least the resin which is injected from the path closed earliest with a crystallinity greater than or equal to a predetermined crystallinity degree.

According to the above-described method, after the second path is closed to stop injection of the resin, the resin is injected from the first path, by which the resin from the first path submerges into the resin from the second path. Therefore, where the shaped article is viewed in a direction perpendicular to the surface thereof, a surface where the resin from the first path converges with the resin from the second path inclines in a direction along the line of sight. Further, the resin from the second path, that is, the resin to be submerged, is solidified at least at a predetermined crystallinity or greater, by which at least a surface part of the shaped article at a converged portion becomes semi-transparent or opaque.

Further, the resin injection molding method of the present invention is a method for molding resins inside a cavity formed within a mold. The method comprises injecting resins into the cavity through a plurality of paths installed so as to be openable and closable and optionally maintaining the resin inside the cavity at a pressure; closing each of the plurality of paths such that the resins injected from each path converge, there being a time difference between when a first path of the plurality of paths is injected the resin and optionally maintained the resin inside the cavity at pressure which is completed maintaining at pressure and a second path of the plurality of paths is injected the resin and optionally maintained the resin inside the cavity at pressure which is completed maintaining at pressure; and solidifying at least the resin which is injected from the path at which injecting the resin and optionally maintaining the resin inside the cavity at pressure which is completed maintaining at pressure earliest with a crystallinity greater than or equal to a predetermined crystallinity degree.

According to the above-described method, after maintaining the resin inside the cavity at pressure is completed at the second path, the resin is continuously injected or the resin inside the cavity being maintained at pressure at the first path, by which the resin which has been injected from the first path submerges into the resin which has been injected from the second path. Therefore, where the shaped article is viewed in a direction perpendicular to the surface thereof, a surface where the resin from the first path converges with the resin from the second path inclines in a direction along the line of sight. Further, the resin from the second path, that is, the resin to be submerged, is solidified at least at a predetermined crystallinity or greater. Thereby, at least a surface part of the shaped article at the converged portion becomes semi-transparent or opaque.

Still further, the resin injection molding method of the present invention is a method for molding resins inside a cavity formed within a mold. The method comprises injecting resins into the cavity through a plurality of paths installed so as to be openable and closable, and maintaining the resin inside the cavity at a pressure; closing each of the plurality of paths such that the resins injected from each path converge, there being a pressure difference between in a first path being maintained the resin at a pressure value and a second path being maintained the resin at a pressure value; and solidifying at least the resin, which is injected from the path maintained in lowest pressure value with a crystallinity greater than or equal to a predetermined crystallinity degree.

According to the above-described method, after convergence of the resin from the first path with the resin from the second path, the resin from the first path maintained in higher pressure value submerges into the resin from the second path maintained in lower pressure value. Therefore, where the shaped article is viewed in a direction perpendicular to the surface thereof, a surface where the resin from the first path converges with the resin from the second path inclines in a direction along the line of sight. Further, the resin from the second path, that is, the resin to be submerged is solidified at least at a predetermined crystallinity or greater. Thereby, at least a surface part of the shaped article at the converged portion becomes semi-transparent or opaque.

Further, the resin injection molding method of the present invention is characterized in that maintaining the pressure value of the resin injected from the first path and the pressure value of the resin injected from the second path so as to cause pressure difference between the pressure values of each path of the plurality of paths, after convergence of the resin injected from each of the paths.

According to the above-described method, only after convergence of the resin from the first path with the resin from the second path, a difference may be given between the pressure values at which the resins are held at pressure at both of the paths. Therefore, it is possible to easily control the values of holding pressure at both of the paths.

Further, the resin injection molding method of the present invention is characterized in that the crystallinity degree is 20%.

According to the above-described method, resin crystals are grown in a sufficient quantity for blocking light, thereby suppressing reflection and transmission of light on the converged surface of the resins. As a result, at least a surface part of the shaped article at the converged portion becomes semi-transparent or opaque due to irregular reflection of light. Then, a difference between reflected light and transmission light at the converged portion and those at a site away from the converged portion can be made into a level which is substantially not visibly recognizable.

Still further, the resin injection molding method of the present invention is characterized in that maintaining a temperature of the mold in the vicinity of a converged portion of the resins injected from each of the paths in a range from a heat distortion temperature of the resin to a melting point of the resin, during at least a part of a period of time from when each of the paths are closed until a shaped article undergoes solidification of the surface of the shaped article.

According to the above-described method, thermal energy necessary for heating the mold is small so as to improve productivity. Further, since a period of time is short for maintaining the temperature of the mold greater than or equal to the melting point of the resin, the resin is prevented from being unnecessarily reduced in viscosity to enter into very fine recesses on the surface of the mold. Therefore, the shaped article is not made in excessively close contact with the mold and can be easily released from the mold when the shaped article is taken out from the mold. Further, the temperature of the mold after convergence is kept in a range from the heat distortion temperature of the resin to the melting point. Thereby, a convergence line on the uppermost surface of the shaped article can be caused to disappear, and the converged portion between crystalline resins can be also substantially adhered. Thus, it is possible to prevent the converged portion from easily peeling off. Further, since the converged portion is substantially adhered to improve joint strength, it is unnecessary for maintaining the resin at high pressure due to the improved joint strength. Therefore, it is possible to reduce the remaining stress at the converged portion and also prevent deformation of the shaped article resulting from residual strain, or the like. Further, the temperature of the mold after convergence is kept lower than or equal to the melting point of the resin, thus making it possible to shorten the cooling time of the mold for solidifying the shaped article and improve productivity.

The resin injection molding method of the present invention is characterized in that the time at which each of the paths are closed is given as the time at which the resin is maintained inside the cavity at pressure, and the temperature of the mold when the resin is maintained inside the cavity at pressure is made lower than or equal to the heat distortion temperature of the resin.

The above-described method is able to prevent, with the resin maintained at pressure, occurrence of a sink mark on the surface of the shaped article along with progress of solidification of the resin.

Further, the resin injection molding method of the present invention is characterized in that the resin injected from each of the paths are crystalline resins.

According to the above-described method, a crystalline resin relatively high in crystallinity that characterizes each crystalline resin is used to carry out molding under selected molding conditions. The resin is solidified so that the shaped article is 20% or greater in crystallinity, thus making it possible to easily obtain effects of the present invention.

Advantageous Effects of the Invention

In a conventional technique, where the shaped article is viewed in a direction perpendicular to the surface thereof, a surface where resins converge hardly inclines in a direction along the line of sight, and the converged surface concentrates in the vicinity immediately below a convergence line on the uppermost surface of the shaped article. Thus, light reflected on the converged surface appears in a concentrated manner in the vicinity of the convergence line which is on the uppermost surface, causing a difference between the reflected light and the transmission light at the converged portion and those at a site away from the converged portion, and the converged portion is visibly recognized as a line. On the other hand, according to the resin injection molding method of the present invention, the surface where the resin injected from the first path converges with the resin injected from the second path inclines in a direction along the line of sight. Thereby, the converged surface which is an optical border is spread in a perpendicular direction (horizontal direction) with respect to the direction along the line of sight. Therefore, light reflected on the converged surface does not concentrate in the vicinity of the convergence line on the uppermost surface but spreads to an area away from the convergence line on the uppermost surface. Also, the converged surface is less recognizable as a line and accordingly the boundary line of the resins is blurred and suppressed the appearance. Further, the resin is solidified at a predetermined crystallinity or greater, by which at least a surface part of the shaped article at the converged portion can be made semi-transparent or opaque. Therefore, light is irregularly reflected by resin crystals, and the boundary line of the resins is blurred and suppressed the appearance. Thereby, the boundary line of the resins will not disfigure the shaped article. Still further, the mold is heated to carry out molding, thereby causing a weld at the converged portion to substantially disappear, and the converged portion is made substantially visibly unrecognizable. In addition, the resins easily converge at a high temperature state at which the resins have a sufficient fluidity, and also the converged surface can be entirely made into a smooth continuous surface. Therefore, it is possible to prevent a singular point resulting from the reflection of light which occurs when the resins undergo partial solidification to produce a discontinued surface at the converged portion and which also contributes to easy recognition of the converged portion (boundary line).

BEST MODE FOR CARRYING OUT THE INVENTION

Figure 1:
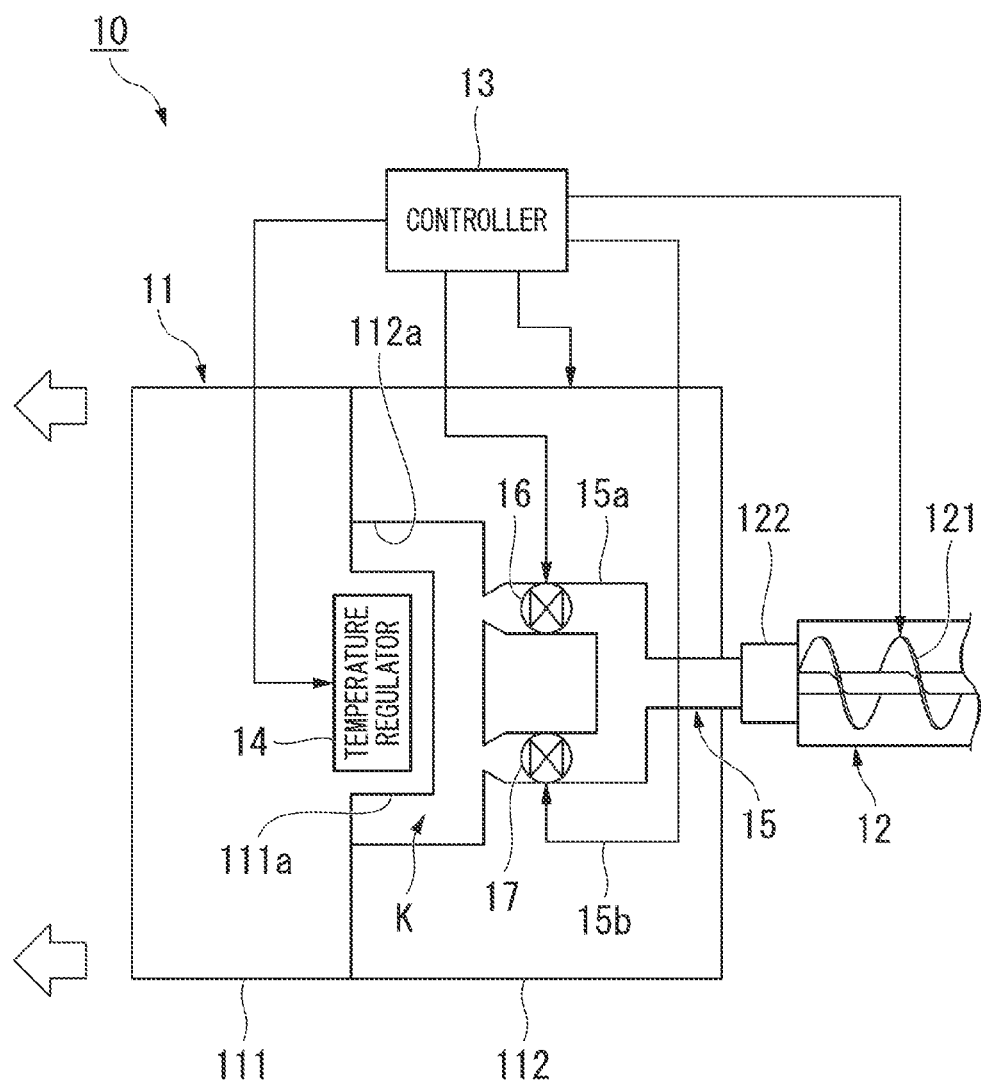
FIG. 1 is a schematic sectional view which shows a constitution of a mold unit 10 used in a resin injection molding method of a first embodiment of the present invention.

Hereinafter, a description will be given of the embodiments of the present invention with reference to the drawings. First, a description will be given of the mold unit which is used in the resin injection molding method of the first embodiment of the present invention. FIG. 1 is a schematic sectional view which shows a constitution of the mold unit 10. The mold unit 10 is provided with a mold main body 11 which forms a cavity K, an injection cylinder 12 which is installed by being connected to the mold main body 11 and a controller 13 for controlling motions of various parts.

The mold main body 11 is constituted with a fixed mold 112 fixed to a molding machine and the movable mold 111 installed so as to move with respect to the fixed mold 112. Then, the cavity K is formed between a recessed part 112a of the fixed mold 112 and a raised part 111a of the movable mold 111 which are installed so as to oppose each other.

The movable mold 111 is provided at a position close to the cavity K with a temperature regulator 14 for heating and cooling the mold main body 11 by using a heating medium or electrical means. The temperature regulator 14 is controlled by the controller 13. Thereby, a temperature of the mold main body 11 in the vicinity of the cavity K can be arbitrarily adjusted. Further, the temperature regulator 14 for heating and cooling the mold main body 11 by using a heating medium or electrical means may be installed at a position close to the cavity K of the fixed mold 112 or may be installed both on the movable mold 111 and the fixed mold 112.

A runner (path) 15 which communicatively connects the cavity K with the outside is formed at the fixed mold 112. This runner 15 is branched into a first runner 15a (the first path) and a second runner 15b (the second path). The first gate valve 16 is installed on the path of the first runner 15a so as to be openable and closable, while the second gate valve 17 is installed on the path of the second runner 15b so as to be openable and closable. Then, the first gate valve 16 and the second gate valve 17 are opened and closed by the controller 13. According to the above-described constitution, the first gate valve 16 and the second gate valve 17 are opened and closed, by which injection start/injection stop of a resin from the first runner 15a to the cavity K and injection start/injection stop of a resin from the second runner 15b to the cavity K can be arbitrarily switched with each other. Further, although not shown in detail in FIG. 1, the movable mold 111 is able to move in a direction moving away from the fixed mold 112 under control by the controller 13. Thereby, on releasing the shaped article from the mold, the movable mold 111 can be separated from the fixed mold 112 to take out the shaped article from the cavity K.

The injection cylinder 12 injects a resin to be filled into the cavity K and maintains inside the cavity K at pressure. As shown in FIG. 1, an injection screw 121 is installed inside the injection cylinder 12 so as to rotate freely and the leading end 122 thereof is connected to one end of the runner 15. Then, the injection screw 121 is controlled for motions by the controller 13. According to the thus constituted injection screw 121, the injection screw 121 is first rotated to deliver the resin in a molten state to the leading end side, and the resin is sequentially stored at the leading end 122 of the injection cylinder 12. Thereafter, when the resin stored at the leading end 122 thereof reaches a certain quantity, the injection cylinder 12 stops its rotation and also moves forward to the leading end thereof. Accordingly, the resin stored at the leading end 122 is pressed by the injection screw 121, injected from the leading end 122 and filled into the cavity K through the runner 15. When the cavity K is filled with the resin, the resin is maintained at pressure by the injection screw 121. That is, the resin is constantly maintained at a certain pressure. A pressure value at which the resin is maintained at pressure can be arbitrarily adjusted by the controller 13 which causes the injection screw 121 to change positions and advancing speed or causes the injection screw 121 to change in advancing force whenever necessary.

Figure 2:
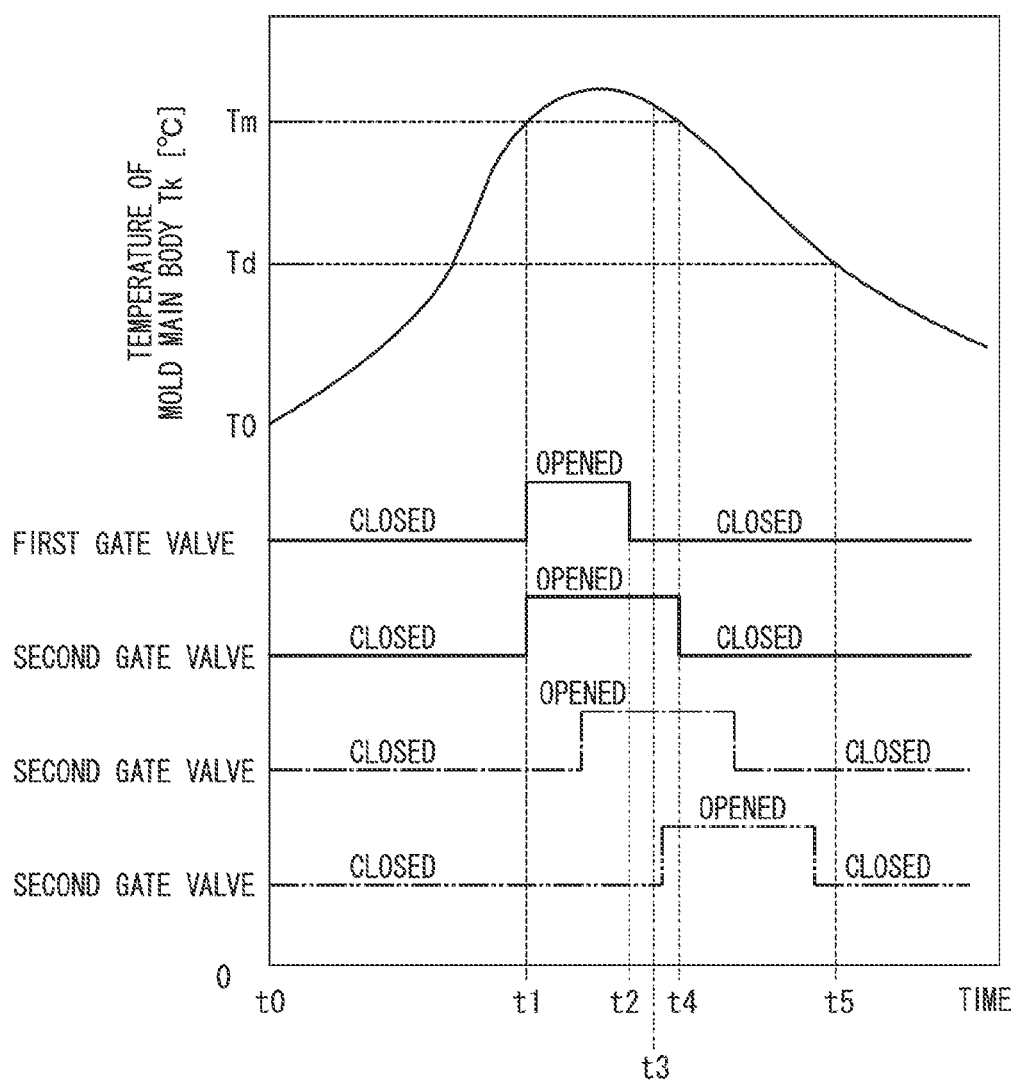
FIG. 2 is a graph which shows changes over time in the temperature of a movable mold 111 in the first embodiment and the opening/closing of a first gate valve 16 and a second gate valve 17.
Figure 3A:
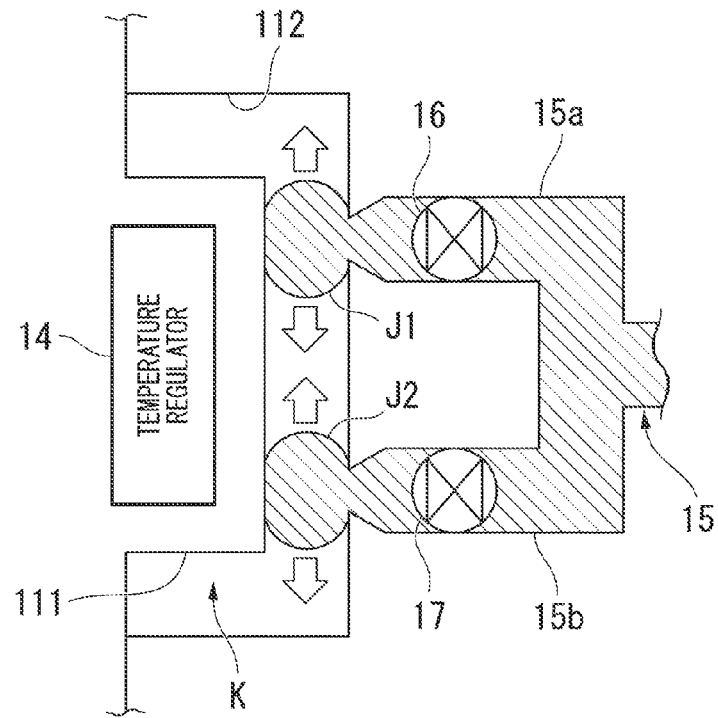
FIG. 3A is a partially enlarged sectional view which shows the vicinity of a cavity K in FIG. 1.
Figure 3B:
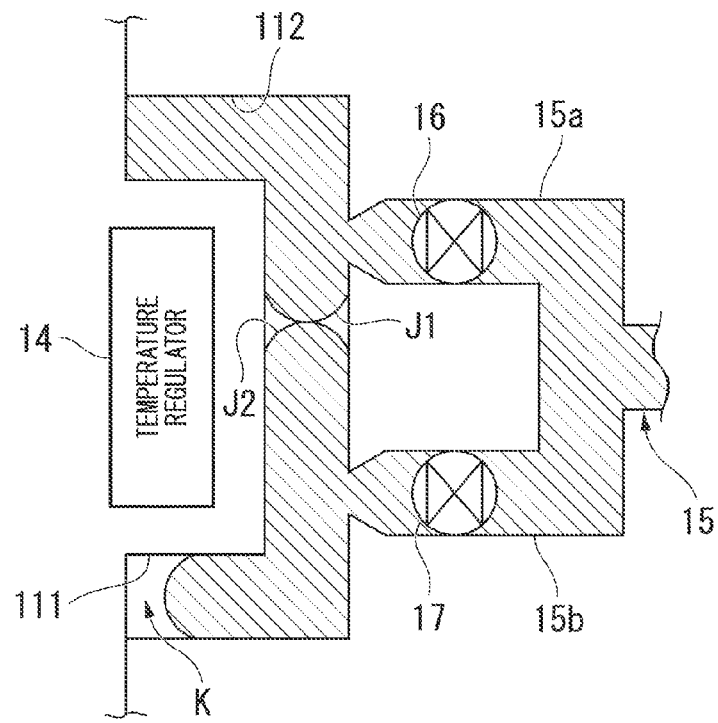
FIG. 3B is a partially enlarged sectional view which shows the vicinity of the cavity K in FIG. 1.
Figure 4:
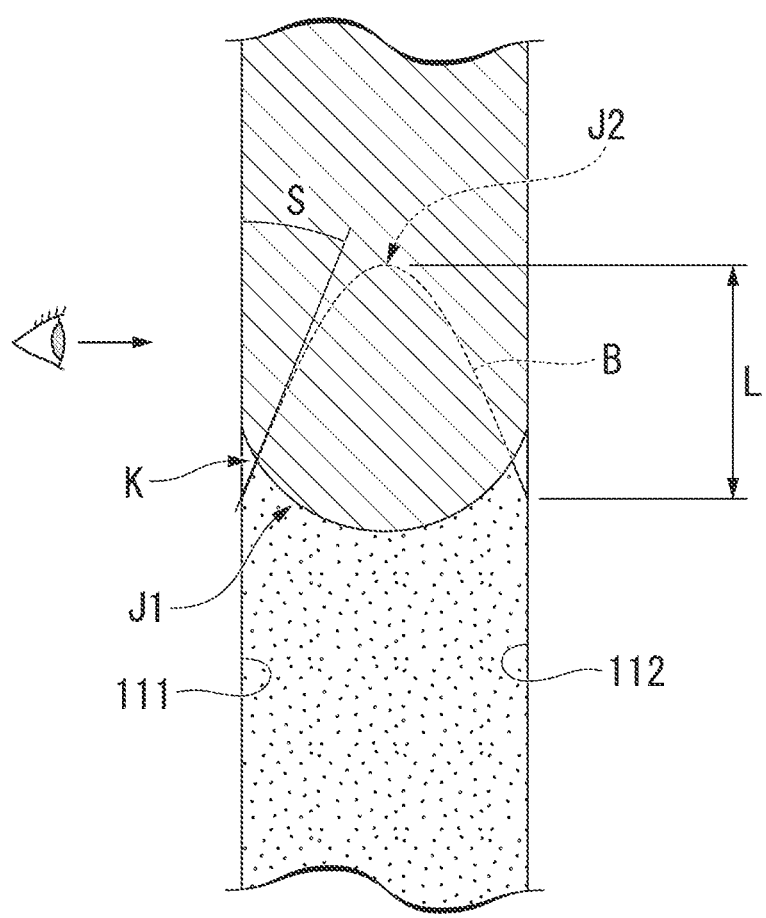
FIG. 4 is a schematic sectional view which shows the vicinity of a converged portion between resins at the cavity K.

Next, a description will be given of the resin injection molding method of the first embodiment. The injection molding method of the first embodiment is characterized in that a resin to be injected is a crystalline resin (hereinafter, simply abbreviated as a "resin"), the resin is solidified at a crystallinity of 20% or greater, a difference is given between the time at which the first gate valve 16 is closed and the time at which the second gate valve 17 is closed. Here, FIG. 2 is a graph which shows changes over time in the temperature of the movable mold 111 and the opening/closing of the first gate valve 16 and the second gate valve 17 over time. Each of FIG. 3A and FIG. 3B is a partially enlarged sectional view which shows the vicinity of the cavity K in FIG. 1. Further, FIG. 4 is a schematic sectional view which shows the vicinity of a converged portion of the resins at the cavity K.

On molding the resin, first, as shown in FIG. 2, at time t0 in a state when the first gate valve 16 and the second gate valve 17 are both kept closed, the temperature regulator 14 shown in FIG. 1 is actuated to start heating the mold main body 11. Thereby, a temperature Tk of the mold main body 11 starts to gradually or rapidly rise from a temperature T0 which is substantially equal to an ambient temperature, with a temperature equal to or higher than a melting temperature of the resin given as a heating target temperature.

Thereafter, as shown in FIG. 2, at time t1 after a predetermined time from the time t0, the first gate valve 16 and the second gate valve 17 are both opened. Then, in this state, the resin is injected from the injection cylinder 12. Then, the injected resin is branched into the first runner 15a and the second runner 15b, and the branched resins circulate at substantially equal speeds respectively through the first runner 15a and the second runner 15b. Then, as shown in FIG. 3A, a resin J1 which has been branched into the first runner 15a runs beyond the first gate valve 16, flows into the cavity K and spreads to both sides toward a flowing direction. Similarly, a resin J2 which has been branched into the second runner 15b also runs beyond the second gate valve 17, flows into the cavity K and spreads to both sides toward the flowing direction at a speed substantially equal to that of the resin J1 which has been branched into the first runner 15a. Moreover, as shown in FIG. 2, at the time t1, the temperature Tk of the mold main body 11 reaches a temperature Tm which is the melting point of the resin.

Then, as shown in FIG. 2, at time t2 after a predetermined time from the time t1, only the first gate valve 16 is closed. Thereby, the resin J1 stops flowing from the first runner 15a into the cavity K, and the resin J1 stops flowing from the first runner 15a. On the other hand, since the second gate valve 17 is kept open, the resin J2 continues to flow from the second runner 15b into the cavity K. The resin J2 from the second runner 15b spreads further into the cavity K. Moreover, as shown in FIG. 2, at this time t2, the temperature Tk of the mold main body 11 reaches a temperature which is higher than the melting temperature Tm of the resin. Then, before or after the time t2, the temperature regulator 14 is controlled to start cooling the mold main body 11. Thereby, the temperature Tk of the mold main body 11 starts to gradually fall. At this time, a speed at which the temperature Tk of the mold main body 11 falls by cooling is adjusted by increasing or decreasing a flow rate of a coolant supplied to the mold by the temperature regulator 14 or adjusted by raising or lowering or the like a temperature of the coolant. Thereby, the resin is cooled in such a manner that the resin is 20% or greater in crystallinity. Crystallization speeds vary depending on types of resins. Therefore, in accordance with crystallization characteristics of the resin, the cavity K is adjusted for cooling speed (the falling speed of the temperature Tk) when necessary in such a manner that the surface of the shaped article after solidification of the resin is at least 20% or greater in crystallinity. It is acceptable that in place of adjusting the falling speed of the temperature Tk or in addition to adjustment of the falling speed of the temperature Tk, the temperature regulator 14 is used to reheat the mold in a cooling step or stop supplying the coolant or the like, by which the temperature Tk is kept at a temperature close to a crystallization temperature for a predetermined time to adjust the crystallinity of the resin.

Thereafter, at time t3 after a predetermined time from the time t2, as shown in FIG. 3B, a leading-end part of the resin J2 from the second runner 15b converges with a leading-end part of the resin J1 from the first runner 15a. Then, when the resin further flows into the cavity K from the second runner 15b, as shown in FIG. 4, the leading-end part of the resin J2 from the second runner 15b submerges into the resin J1 from the first runner 15a. Therefore, as shown in FIG. 4, where the resin J1 and the resin J2 are viewed in a direction perpendicular to the surface thereof, a converged surface between the resin J1 from the first runner 15a and the resin J2 from the second runner 15b inclines in the direction along the line of sight. Thereby, the converged surface is less recognizable as a line and a boundary line B between the resin J1 and the resin J2 is blurred and suppressed the appearance. Still further, as described above, the resin is solidified so as to be 20% or greater in crystallinity. Therefore, the surface of the resin becomes semi-transparent or opaque, and the boundary line B between the resin J1 and the resin J2 is further blurred and suppressed the appearance. At this time, in order to suppress the appearance of the boundary line B, it is preferable that an angle S formed by an extension line on the surface of the shaped article and a tangent line at the converged surface in the vicinity of the surface of the shaped article is 25 degrees or less. The angle S is preferably 15 degrees or less and more preferably 10 degrees or less. Alternatively, it is preferable that a submerged quantity of the resin J2 with respect to the resin J1 (submerged distance) L is greater than or equal to a thickness of the shaped article at the converged portion. The submerged quantity is preferably at least two times or more the thickness of the shaped article. The submerged quantity is more preferably at least three times or more the thickness of the shaped article.

Thereafter, as shown in FIG. 2, at time t4 after a predetermined time further from the time t3, the second gate valve 17 is closed. Thereby, the resin from the second runner 15b stops flowing into the cavity K, and the resin J2 from the second runner 15b stops flowing at the leading-end part thereof. Moreover, at the time t3, the temperature Tk of the mold main body 11 is still higher than the melting point Tm of the resin and continues to fall.

Thereafter, at time t5 after a predetermined time further from the time t4, solidification of the resin progresses. In FIG. 2, the second gate valve 17 is closed at the time t4. However, it is also acceptable that after the temperature of the resin falls to a temperature lower than or equal to the heat distortion temperature Td (time t5) of the resin, the second gate valve 17 is closed. Thereby, it is possible to prevent, with the resin maintained at pressure, occurrence of a sink mark on the surface while solidification of the resin is in progress. Then, although not shown in detail in the drawing, the mold main body 11 is further decreased in temperature to result in solidification of the resin, by which the shaped article is released from the mold. That is, the movable mold 111 is caused to move in a direction moving away from the fixed mold 112 to take out the shaped article from the cavity K.

In the present embodiment, the first gate valve 16 and the second gate valve 17 are at the same time opened at the time t1. It is, however, also acceptable that not only is a difference given between the time at which the first gate valve 16 is closed and the time at which the second gate valve 17 is closed but also a difference is given between the time at which the first gate valve 16 is opened and the time at which the second gate valve 17 is opened. For example, as shown in the alternate long and short dashed line in FIG. 2, during which the first gate valve 16 is opened at the time t1 and then closed at the time t2, the second gate valve 17 may be opened. Further, as shown in the alternate long and two short dashed lines in FIG. 2, after the first gate valve 16 is closed at the time t2, the second gate valve 17 may be opened. Of course in either cases, it is the same in that the time at which the second gate valve 17 is closed is later than the time at which the first gate valve 16 is closed.

Further, in the present embodiment, so that a difference is given between the time at which the first gate valve 16 is closed and the time at which the second gate valve 17 is closed, the time at which the first gate valve 16 is closed is made earlier than the time at which the second gate valve 17 is closed. It is, however, acceptable that in contrast thereto, the time at which the second gate valve 17 is closed is made earlier than the time at which the first gate valve 16 is closed. Further, as in the above case, the time at which the second gate valve 17 is closed is made later than the time at which the first gate valve 16 is closed. In contrast thereto, the time at which the first gate valve 16 is closed may be made later than the time at which the second gate valve 17 is closed.

Further, the mold unit 10 is used in the present embodiment. In place of the mold unit 10, however, a mold unit 20 may be used which will be described later and used in the second embodiment and the third embodiment shown in FIG. 5. In this instance, separate injection cylinders 23, 24 are connected respectively to a first runner 21 and a second runner 22, by which resins different in properties can be injected to the first runner 21 and the second runner 22. Therefore, the resin which has been injected into either the runner 21 or the runner 22 that is communicatively connected to the cavity K inside the heated mold and at least closes a gate valve earlier may be solidified so as to be 20% or greater in crystallinity. Then, the resin on a runner that closes the gate valve earlier, that is, the resin to be submerged after convergence, forms the surface of the shaped article. Therefore, as described above, an effect is obtained that suppresses the appearance of the boundary line B of the resins.

EXAMPLE 1

The inventors have discovered a technique to suppress the appearance of a weld which is a border of the converged portion by conducting an actual molding trial under the procedures shown below. Of a pair of paths where injected resins converge with each other, a difference is given in between the time at which the first path is closed and the time at which the second path is closed. In addition, the resin, which is injected from a path which is closed at an earlier time, that is, the resin to be submerged, is solidified at a crystallinity greater than or equal to a predetermined crystallinity. Further, so that the effect of the present invention is substantially effective (in order to suppress the appearance of a weld to a degree that is acceptable as a final product on the market), the inventors have found that the resin to be submerged needs to be 20% or greater in crystallinity.

<Conditions of Injection Molding>

Molding machine: Injection molding machine 450 ME2-50 (screw diameter (φ70) manufactured by Mitsubishi Heavy Industries Ltd.

Resin: Polypropylene

Molding temperature: 230° C.

Heating temperature of mold: 120° C.

Shaped article: flat plate: 495×210×t2 mm

Number of gates: 2

Entire light transmittance: Measurement is made at a wavelength of 555 nm by using an automatic recording spectrophotometer.

Crystallinity is adjusted by taking out a shaped article from the mold, thereafter, placing the shaped article into an oven heated at 100° C. for reheating and making different the time during which the shaped article is kept inside the heated oven.

TABLE 1

|  | Gate 1 closed | Gate 2 closed | Holding pressure value at gate 1 (MPa) | Holding pressure value at gate 2 (MPa) | Crystallinity (%) | Entire light transmittance (%) | Weld (visual examination) |
|---|---|---|---|---|---|---|---|
| Comparative example 1-1 | One second after start of injection | Two seconds after start of injection | 100 | 100 | 12 | 79 | C |
| Comparative example 1-2 | Same as above | Same as above | Same as above | Same as above | 16 | 76 | B |
| Example 1-1 | Same as above | Same as above | Same as above | Same as above | 21 | 71 | B~A |
| Example 1-2 | Same as above | Same as above | Same as above | Same as above | 29 | 63 | A |
| Example 1-3 | Same as above | Same as above | Same as above | Same as above | 42 | 55 | A |

A: No weld line is confirmed by visual examination (at a level that is acceptable as a final product on the market)
B: A weld line is confirmed by close visual examination.
C: A weld line is confirmed at a first glance.

Figure 5:
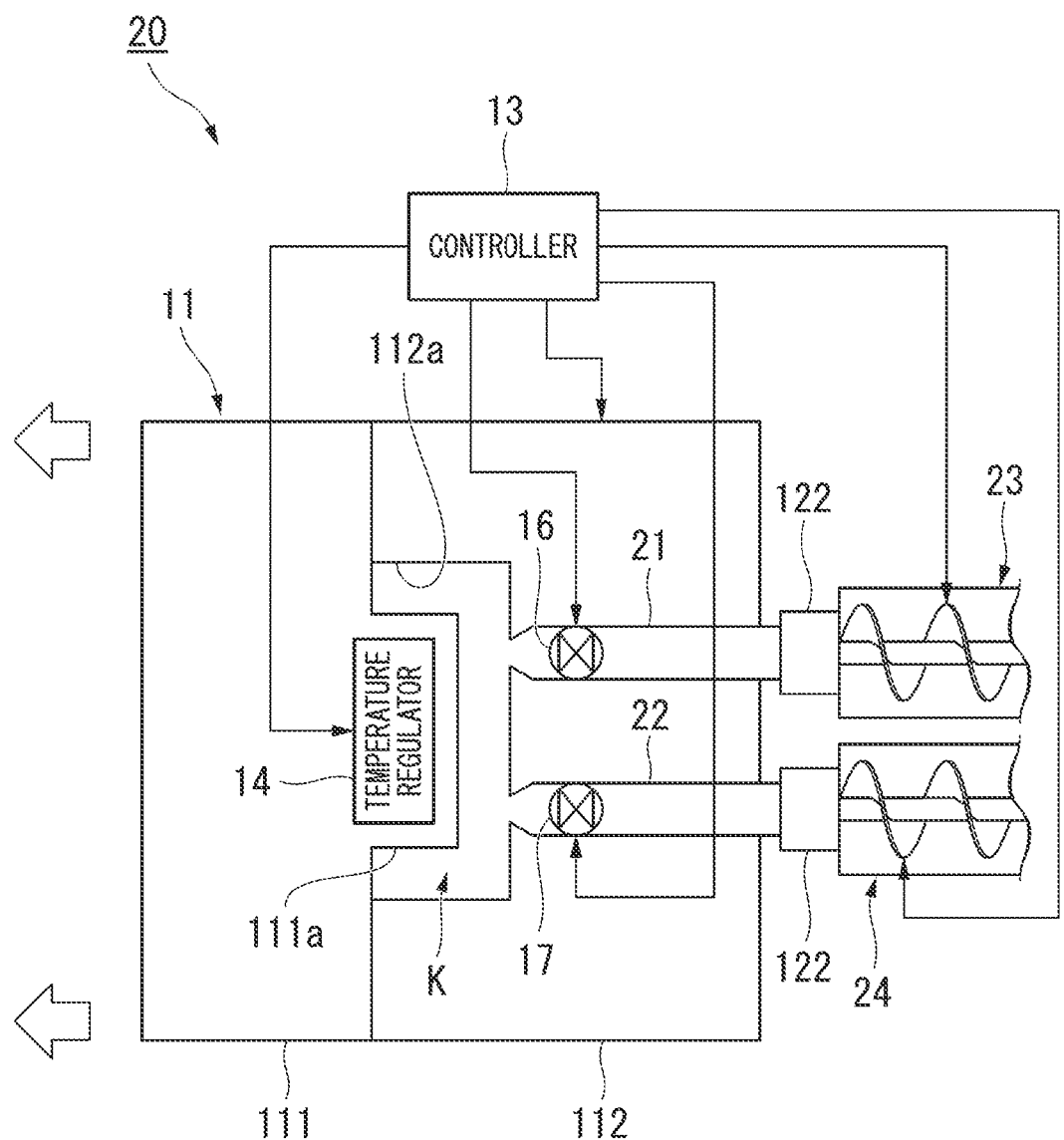
FIG. 5 is a schematic sectional view which shows a constitution of a mold unit 20 used in a resin injection molding method of a second and a third embodiment of the present invention.

Next, a description will be given of the mold unit 20 which is used in the resin injection molding method of the second embodiment and the third embodiment in the present invention. FIG. 5 is a schematic sectional view which shows a constitution of the mold unit 20. The mold unit 20 of the present embodiment is different by comparing with the mold unit of the first embodiment in that a first runner 21 and a second runner 22 are installed independently without being communicatively connected and a first injection cylinder 23 and a second injection cylinder 24 are connected respectively to the runner 21 and the runner 22 and also different in that a cavity region injected from the first injection cylinder 23 and a cavity region injected from the second injection cylinder 24 in the cavity K can be independently controlled for cooling speeds. Since the other constitutions and working effects are the same as those of the first embodiment, they are indicated with the same reference numerals as those of the first embodiment, with a description thereof being omitted here.

Figure 6:
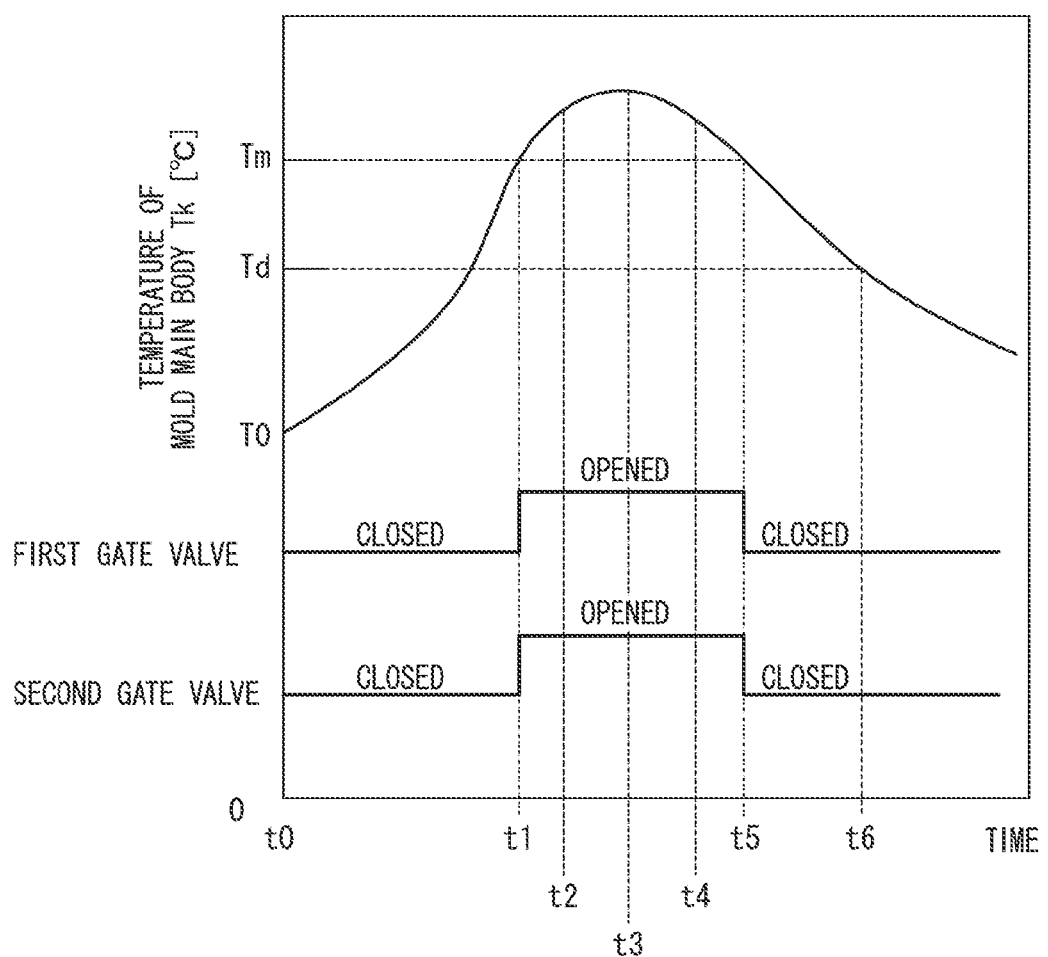
FIG. 6 is a graph which shows changes over time in the temperature of a movable mold 111 in the second embodiment and the opening/closing of a first gate valve 16 and a second gate valve 17.
Figure 7A:
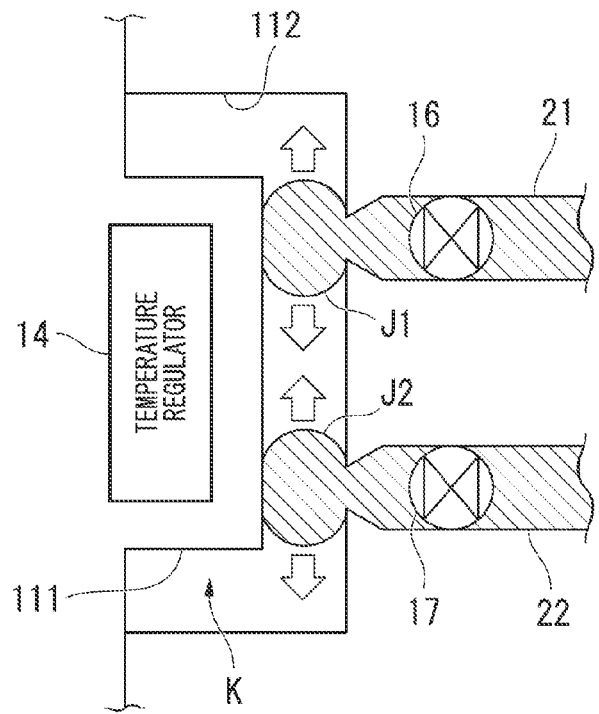
FIG. 7A is a partially enlarged sectional view which shows the vicinity of a cavity K in FIG. 5.

Next, a description will be given of the resin injection molding method of the second embodiment. The injection molding method of the second embodiment is characterized in that the resin injected from the first runner 21 is a crystalline resin (hereinafter simply abbreviated as a "resin"), the resin is solidified at a crystallinity of 20% or greater, and a difference is given between the time at which after the resin inside the cavity is maintained at pressure at the first runner 21 and the time at which after the resin inside the cavity is maintained at pressure at the second runner 22. Here, FIG. 6 is a graph which shows changes over time in temperature of the movable mold 111 and the opening/closing of the first gate valve 16 and the second gate valve 17 over time. Each of FIG. 7A and FIG. 7B is a partially enlarged sectional view which shows the vicinity of the cavity K in FIG. 5.

On molding the resin, first, as shown in FIG. 6, at time t0 when the first gate valve 16 and the second gate valve 17 are both kept closed, a temperature regulator 14 shown in FIG. 1 is actuated to start heating a mold main body 11. Thereby, a temperature Tk of the mold main body 11 starts to gradually or rapidly rise from a temperature T0 which is substantially equal to the ambient temperature.

Thereafter, as shown in FIG. 6, at time t1 after a predetermined time from the time t0, the first gate valve 16 and the second gate valve 17 are both opened. Then, in this state, resins are respectively injected at substantially equal speeds from the first injection cylinder 23 and the second injection cylinder 24. Then, the injected resins circulate through the first runner 21 and the second runner 22 at substantially equal speeds. Then, as shown in FIG. 7A, a resin J1 circulating through the first runner 21 runs beyond the first gate valve 16, flows into the cavity K and spreads to both sides toward a flowing direction. Similarly, a resin J2 circulating through the second runner 22 also runs beyond the second gate valve 17, flows into the cavity K and spreads to both sides toward the flowing direction at a substantially equal speed to that of the resin J1 circulating through the first runner 21. Here, for the purpose of making a simple description, the resins are injected from the first injection cylinder 23 and the second injection cylinder 24 at substantially equal speeds. It is, however, acceptable that the first injection cylinder 23 and the second injection cylinder 24 are controlled independently to inject the resins from each injection cylinder at different injection speeds. Moreover, as shown in FIG. 6, at the time t1, the temperature Tk of the mold main body 11 reaches the temperature Tm which is the melting point of the resin.

Figure 7B:
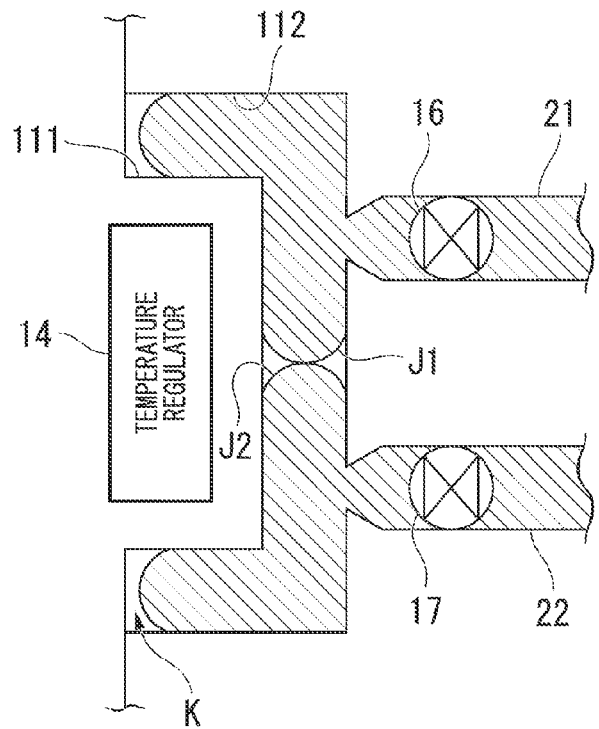
FIG. 7B is a partially enlarged sectional view which shows the vicinity of the cavity K in FIG. 5.

Then, at time t2 after a predetermined time from the time t1, as shown in FIG. 7B, the resin J1 from the first runner 21 converges with the resin J2 from the second runner 22 at the center of the cavity K. As shown in FIG. 5, the first injection cylinder 23 and the second injection cylinder 24 are controlled, thereby starting to maintain at pressure the resin J1 from the first runner 21 and the resin J2 from the second runner 22. Here, a pressure value applied to the resin J1 of the first runner 21 by the first injection cylinder 23 is substantially equal to a pressure value applied to the resin J2 of the second runner 22 by the second injection cylinder 24.

Moreover, as shown in FIG. 6, at the time t2 and time t3, the temperature Tk of the mold main body 11 reaches a temperature higher than the melting point Tm of the resin. Then, before or after the time t2 and time t3, the temperature regulator 14 is controlled to start cooling the mold main body 11. Thereby, the temperature Tk of the mold main body 11 starts to fall gradually. At this time, the cavity on the side of the resin J1 is adjusted for cooling speed, by which cooling on the side of the resin J1 is controlled in such a manner that the resin J1 injected from the first runner 21 is 20% or greater in crystallinity.

Thereafter, at time t3 after a predetermined time from the time t2, the resin J1 inside the cavity from the first runner 21 is maintained at pressure by the first injection cylinder 23. On the other hand, the resin J2 from the second runner 22 is continuously maintained at pressure by the second injection cylinder 24. Thereby, a difference in pressure occurs between the resin J1 from the first runner 21 and the resin J2 from the second runner 22, and the resin J2 is maintained at pressure, by which the resin J1 flows backward to the first injection cylinder 23. Alternatively, as shown in FIG. 4, for example, the leading-end part of the resin J2 from the second runner 22 starts to submerge into the resin J1 from the first runner 21 by pushing away a resin of a flowing terminal end of the resin J1 to which no pressure is applied. Therefore, due to the same reason as that of the first embodiment, a boundary line B between the resin J1 and the resin J2 is blurred and suppressed the appearance. Further, the resin J1 injected from the first runner 21 is solidified so as to be 20% or greater in crystallinity, by which the boundary line B between the resin J1 and the resin J2 is suppressed further the appearance. This is also similar to the first embodiment.

Thereafter, as shown in FIG. 6, at time t4 after a predetermined time from the time t3, the resin J2 inside the cavity from the second runner 22 is maintained at pressure by the second injection cylinder 24. Thereby, the submersion is stopped. Then, at time t5 after a predetermined time from the time t4, the first gate valve 16 and the second gate valve 17 are both closed. Thereby, the resin J1 and the resin J2 stop flowing into the cavity K respectively from the first runner 21 and the second runner 22. Moreover, at the time t5, the temperature Tk of the mold main body 11 reaches the melting point Tm of the resin and further continues to fall.

In the present embodiment, such an example is shown that a difference is given between the times at which after the resin inside the cavity is maintained at pressure by each injection cylinders, and a difference is also given between the times at which each gate valves is closed. However, it is also acceptable that the time at which after the resin inside the cavity is maintained at pressure by each of the injection cylinders is changed to the time at which each of the gate valves is closed. That is, at the time t3 after a predetermined time from the time t2, the resin J1 inside the cavity from the first runner 21 is maintained at pressure by the first injection cylinder 23, at the time t4 after a predetermined time from the time t3, the resin J2 inside the cavity from the second runner 22 is maintained at pressure by the second injection cylinder 24, at the time t5 after a predetermined time from the time t4, the first gate valve 16 and the second gate valve 17 are both closed. However, it is also acceptable that at the time t3 after a predetermined time from the time t2, the first gate valve 16 is closed, and at the time t4 after a predetermined time from the time t3, the second gate valve 17 is closed. As described above, the first gate valve 16 is closed to separate the first injection cylinder 23 from the cavity K, by which the resin inside the cavity substantially is maintained at pressure via the first runner 21 by the first injection cylinder 23. Further, at the time t3, the first gate valve 16 is closed, by which even if after the time t3, the resin J2 is continuously maintained at pressure by the second injection cylinder 24, the resin J1 is pushed by the resin J2 from the second runner 22 which has been maintained at pressure by the second injection cylinder 24. It is, thereby, possible to prevent the resin J1 from flowing backward via the first runner 21 to the first injection cylinder 23 side. Further, closure of the gate valve 16 will not allow the resin J1 to flow backward. Therefore, a resin at the flowing terminal end of the resin J1 which has been pushed away by the resin J2 flows into the upstream side of the resin J2 along a wall surface of the cavity. Thereby, the resin J2 is increased in apparent quantity submerged to the resin J1 side to cause decreasing an angle S formed by an extension line of the surface of the shaped article at a converged surface and an inclined tangent line at the converged surface. It is, thus, possible to further suppress the appearance of a boundary line B of the resin J1 and the resin J2. In order to prevent the resin J1 from flowing backward to the first injection cylinder 23 side, it is acceptable that such control is provided that in place of closing the gate valve 16, an injection screw inside the first injection cylinder 23 is retained at a predetermined position so as not to move backward.

Thereafter, at time t6 after a predetermined time from the time t5, solidification of the resin progresses. In FIG. 6, the second gate valve 17 is closed at the time t5. However, it is also acceptable that the resin J2 inside the cavity from the second runner 22 is maintained at pressure by the second injection cylinder 24 at the time t6 when the temperature falls to or less than the heat distortion temperature Td of the resin. After the temperature falls to the heat distortion temperature Td (time t6) of the resin, the second gate valve 17 is closed, by which it is possible to prevent, with the resin maintained at pressure, occurrence of a sink mark on the surface of the shaped article while solidification of the resin is in progress. Then, although not shown in detail in the drawing, when the mold main body 11 is further decreased in temperature which results in complete solidification of the resin, the shaped article is released from the mold. That is, the movable mold 111 is caused to move in a direction moving away from the fixed mold 112 to take out the shaped article from the cavity K.

In the present embodiment, so that there is a difference between the time at which maintaining the resin inside the cavity from the first runner 21 at pressure is completed and the time at which maintaining the resin inside the cavity from the second runner 22 at pressure is completed, the time at which maintaining the resin inside the cavity from the first runner 21 at pressure is completed is made earlier than the time at which maintaining the resin inside the cavity from the second runner 22 at pressure is completed. However, in contrast thereto, the time at which maintaining the resin inside the cavity from the second runner 22 at pressure is completed may be made earlier than the time at which maintaining the resin inside the cavity from the first runner 21 at pressure is completed. Further, as in the above, the time at which maintaining the resin inside the cavity from the second runner 22 at pressure is completed is made later than the time at which maintaining the resin inside the cavity from the first runner 21 at pressure is completed. In contrast thereto, the time at which maintaining the resin inside the cavity from the first runner 21 at pressure is completed may be made later than the time at which maintaining the resin inside the cavity from the second runner 22 at pressure is completed.

Further, in the present embodiment, with consideration given to that the surface of the shaped article is formed in the vicinity of a converged portion on the side which is submerged, that is, on the side of the first runner 21 at which maintaining the resin inside the cavity at pressure is completed earlier, the cavity K on the side of the resin J1 injected from the first runner 21 on the cavity K is adjusted for cooling speed, by which only the resin J1 is solidified so as to be 20% or greater in crystallinity. However, the present invention shall not be limited thereto. It is also acceptable that in order to make uniform the state of the surface of the shaped article, the cavity K is adjusted for cooling speed, by which the resin J2 injected from the second runner 22 is also solidified so as to be 20% or greater in crystallinity.

EXAMPLE 2

The inventors have discovered a technique to suppress the appearance of a weld which is a border of the converged portion by conducting an actual molding trial under the procedures shown below. Of a pair of paths where injected resins converge with each other, a difference is given between the time at which maintaining a resin inside the cavity at pressure is completed at the first path and the time at which maintaining a resin inside the cavity at pressure is completed at the second path. In addition, the resin, which is injected from the path at which maintaining the resin inside the cavity at pressure is completed at an earlier time, that is, the resin to be submerged, is solidified at a crystallinity greater than or equal to a predetermined crystallinity. Further, in the present example as well, so that the effect of the present invention is substantially effective (the appearance of the weld is suppressed to a degree that is acceptable as a final product on the market), the inventors have found it necessary that the resin to be submerged needs to be 20% or greater in crystallinity. It is noted that injection molding conditions which have not been described are the same as those of the example 1.

TABLE 2

| | Completion of maintaining the pressure by first injection cylinder | Completion of maintaining the pressure by second injection cylinder | Holding pressure value at gate 1 (MPa) | Holding pressure value at gate 2 (MPa) | Crystallinity (%) | Entire light transmittance (%) | Weld (visual examination) |
|---|---|---|---|---|---|---|---|
| Example 2-1 | One second after start of injection | Two seconds after start of injection | 100 | 100 | 28 | 63 | A |
| Example 2-2 | Same as above | Same as above | Same as above | Same as above | 21 | 71 | A |
| Comparative example 2-1 | Same as above | Same as above | Same as above | Same as above | 15 | 76 | B~A |
| Comparative example 2-2 | Same as above | Same as above | Same as above | Same as above | 11 | 79 | C |

A: No weld line is confirmed by visual examination (at a level that is acceptable as a final product on the market)
B: A weld line is confirmed by close visual examination.
C: A weld line is confirmed at a first glance.

Figure 8:
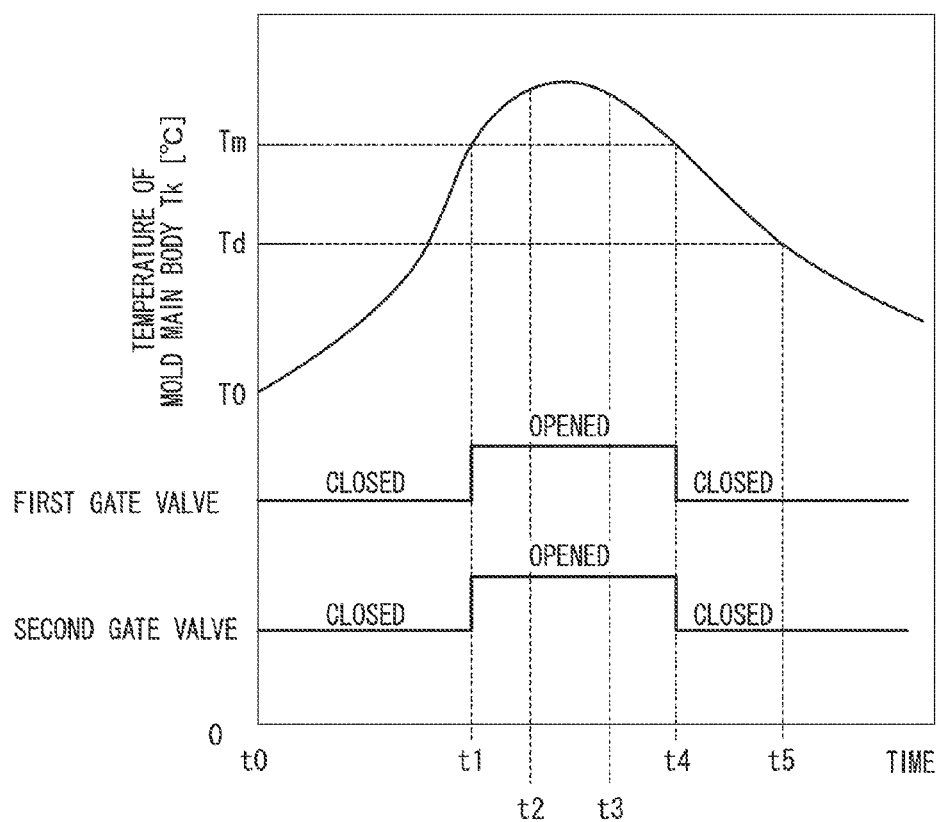
FIG. 8 is a graph which shows changes over time in the temperature of a movable mold 111 in the third embodiment and the opening/closing of a first gate valve 16 and a second gate valve 17.

Next, a description will be given of the resin injection molding method of the third embodiment. The injection molding method of the third embodiment is characterized in that the resin which is injected from a first runner 21 is a crystalline resin (hereinafter, simply abbreviated as a "resin"), the resin is solidified at a crystallinity of 20% or greater, and a difference is given between a pressure value at which the resin from the first runner 21 is maintained at pressure and a pressure value at which the resin from a second runner 22 is maintained at pressure. Here, FIG. 8 is a graph which shows changes over time in temperature of a movable mold 111 and the opening/closing of a first gate valve 16 and a second gate valve 17 over time.

In the present embodiment, since steps from time t0 to time t1 are the same as those of the second embodiment, a description thereof will be omitted here. That is, at the time t0, heating of a mold main body 11 is started, at the time t1, the first gate valve 16 and the second gate valve 17 are both opened to inject the resins at substantially equal speeds from a first injection cylinder 23 and a second injection cylinder 24.

Then, at time t2 after a predetermined time from the time t1, as shown in FIG. 7B, when a resin J1 from the first runner 21 converges with a resin J2 from the second runner 22 at the center of a cavity K, the first injection cylinder 23 and the second injection cylinder 24 are controlled in such a manner that the resin J1 and the resin J2 respectively from the first runner 21 and the second runner 22 start to be maintained at pressure. Here, a pressure value applied to the resin J1 of the first runner 21 by the first injection cylinder 23 is made lower than a pressure value applied to the resin J2 of the second runner 22 by the second injection cylinder 24. Thereby, a difference in pressure occurs between the resin J1 from the first runner 21 and the resin J2 from the second runner 22. As with the second embodiment and as shown in FIG. 4, the leading-end part of the resin J2 from the second runner 22 starts to submerge into the resin J1 from the first runner 21 immediately after convergence. Therefore, due to a similar reason as in the first example, a boundary line B between the resin J1 and the resin J2 is blurred and suppressed the appearance.

Thereafter, at time t3 after a predetermined time from the time t2, maintaining the resin J1, which is from the first runner 21 by the first injection cylinder 23, at pressure is completed and maintaining the resin J2, which is from the second runner 22 also by the second injection cylinder 24, at pressure is completed. Thereby, the submersion is stopped. Moreover, as shown in FIG. 8, at the time t3, the temperature Tk of the mold main body 11 reaches a temperature higher than the melting point Tm of the resin. Then, before and after the time t2 and the time t3, a temperature regulator 14 is controlled to start cooling the mold main body 11. Thereby, the temperature Tk of the mold main body 11 starts to gradually or rapidly fall from the temperature Tm. At this time, the cavity K on the side of the resin J1 is adjusted for cooling speed, by which the resin J1 injected from the first runner 21 is solidified so as to be 20% or greater in crystallinity. Thereby, the boundary line B between the resin J1 and the resin J2 is suppressed the appearance, which is also similar to the first embodiment.

Then, at time t4 after a predetermined time from the time t3, the first gate valve 16 and the second gate valve 17 are both closed. Thereby, the resin J1 and the resin J2 respectively from the first runner 21 and the second runner 22 stop flowing into the cavity K. Moreover, at the time t4, the temperature Tk of the mold main body 11 reaches the melting point Tm of the resin and further continues to fall.

In the present embodiment, at the time t3 after a predetermined time from the time t2, maintaining the resin J1, which is from the first runner 21 by the first injection cylinder 23, at pressure is completed and the resin J2, which is from the second runner 22 also by the second injection cylinder 24, at pressure is completed. At the time t4 after a predetermined time from the time t3, the first gate valve 16 and the second gate valve 17 are both closed. However, it is also acceptable that, as with the second embodiment, the time at which maintaining the resin inside the cavity at pressure by each of the injection cylinders is completed is changed to the time at which each of the gate valves is closed. That is, at the time t4 after a predetermined time from the time t3, until the first gate valve 16 and the second gate valve 17 are both closed, the resin J1 from the first runner 21 may be continuously maintained at pressure by the first injection cylinder 23. As described above, the temperature Tk of the mold main body 11 reaches a heating target temperature of the mold and the resin is continuously maintained at pressure until the time t4 when the resin undergoes shrinkage and solidification, thus making it possible to prevent the shaped article from having a poor appearance by a sink mark.

Thereafter, at time t5 after a predetermined time from the time t4, solidification of the resin progresses. It is also acceptable to continue to maintain at the pressure up to the time t5 and the resin J1 from the first runner 21 is continuously maintained at pressure by the first injection cylinder 23 until the first gate valve 16 and the second gate valve 17 are both closed. As described above, the temperature Tk of the mold main body 11 is to be lower than or equal to the heat distortion temperature Td (time t5), by which it is possible to prevent the shaped article from having a poor appearance by a sink mark. Then, although not shown in detail in the drawing, when the mold main body 11 is further decreased in temperature to result in complete solidification of the resin, the shaped article is released from the mold. That is, the movable mold 111 is caused to move in a direction moving away from the fixed mold 112 to take out the shaped article from the cavity K.

In the present embodiment, in order to give a difference between a pressure value at which the resin J1 from the first runner 21 is maintained at pressure and a pressure value at which the resin J2 from the second runner 22 is maintained at pressure, a pressure value applied to the resin J1 of the first runner 21 is made lower than a pressure value applied to the resin J2 of the second runner 22. However, in contrast thereto, the pressure value applied to the resin J2 of the second runner 22 may be made lower than the pressure value applied to the resin J1 of the first runner 21. Further, as in the above, the pressure value applied to the resin J2 of the second runner 22 may be made larger than the pressure value applied to the resin J1 of the first runner 21. In contrast thereto, the pressure value applied to the resin J1 of the first runner 21 may be made larger than the pressure value applied to the resin J2 of the second runner 22.

Further in the present embodiment as well, with consideration given that the surface of the shaped article is formed in the vicinity of a converged portion on the side to be submerged, that is, on the side of the first runner 21 where the resin is maintained at pressure at a lower pressure value, the cooling speed on the side of the resin J1 injected from the first runner 21 on the cavity K is adjusted, by which only the resin J1 is solidified so as to be 20% or greater in crystallinity. However, the present invention shall not be limited thereto. It is also acceptable that, as with the second embodiment, the resin J2 injected from the second runner 22 is also solidified so as to be 20% or greater in crystallinity by adjusting the cooling speed of the cavity.

EXAMPLE 3

The inventors have discovered a technique to suppress the appearance of a weld which is a border of the converged portion by conducting an actual molding trial under the procedures shown below. Of a pair of paths where injected resins converge with each other, a difference is given between a pressure value at which a resin is maintained at pressure at the first path and a pressure value at which a resin is maintained at pressure at the second path. In addition, the resin, which is injected from the first path where the resin is maintained in lower pressure value, that is, the resin to be submerged, is solidified at a crystallinity greater than or equal to a predetermined crystallinity. Further, in the present example as well, so that the effect of the present invention is substantially effective (the appearance of the weld is suppressed to a degree that is acceptable as a final product on the market), the inventors have found that the resin to be submerged needs to be 20% or greater in crystallinity. The injection molding conditions which have not been described are the same as those of the example 1.

TABLE 3

|  | Gate 1 closed | Gate 2 closed | Holding pressure value at gate 1 (MPa) | Holding pressure value at gate 2 (MPa) | Crystallinity (%) | Entire light transmittance (%) | Weld (visual examination) |
|---|---|---|---|---|---|---|---|
| Example 3-1 | One second after start of injection | Two seconds after start of injection | 100 | 150 | 29 | 63 | A |
| Example 3-2 | Same as above | Same as above | Same as above | Same as above | 20 | 70 | A |
| Comparative example 3-1 | Same as above | Same as above | Same as above | Same as above | 16 | 76 | B~A |
| Comparative example 3-2 | Same as above | Same as above | Same as above | Same as above | 11 | 79 | C |

A: No weld line is confirmed by visual examination (at a level that is acceptable as a final product on the market)
B: A weld line is confirmed by close visual examination.
C: A weld line is confirmed at a first glance.

In the first embodiment to the third embodiment which have been so far described, a description has been given of an example of a case where resins are injected and filled into the cavity K from two runners, to which the present invention shall not be, however limited. The above embodiments are also applicable to a case where resins are injected and filled into the cavity K from a plurality of runners, that is, three or more runners. That is, it is acceptable that the pair of runners where the injected resins converge with each other satisfy only a relationship between the first of the runners and the second of the runners as shown in each of the embodiments.

Crystalline resins capable of giving a crystallinity of 20% or greater may include polyethylene, ethylene copolymers (EVA resin, EEA resin, ionomer resin, ethylene/propylene copolymer, etc.), polypropylene resin, polyvinylidene difluoride, fluorocarbon resin, polyvinylidene chloride, polyethylene oxide, polymethylpentene, polyacetal, polyester, polyamide and these copolymers or the like. However, the present invention shall not be limited thereto.

Various shapes and combinations of constituents as well as steps, or the like, shown in the above-described embodiments are only examples and may be changed in various ways based on design requirements, or the like, within a scope not departing from the gist of the present invention.

INDUSTRIAL APPLICABILITY

The present invention is a resin injection molding method in which the method comprises injecting resins into the cavity through a plurality of paths installed so as to be openable and closable and optionally maintaining the resin inside the cavity at a pressure; closing each of the plurality of paths such that the resins injected from each path converge, there being a time difference between when a first path and a second path of the plurality of paths are closed; and solidifying at least the resin which is injected from the path closed earliest with a crystallinity greater than or equal to a predetermined crystallinity degree. According to the above-described resin injection molding method, a boundary line at a converged portion of the resins is blurred and suppressed the appearance and a shaped article is not disfigured by the boundary line of the resins.

DESCRIPTION OF REFERENCE NUMERALS

11: Mold main body (mold)
K: Cavity
15a: First runner (the first path)
15b: Second runner (the second path)
J1, J2: Resin

The invention claimed is:

1. A method for molding resins inside a cavity formed within a mold, the method comprising:
heating the mold to a temperature equal to or higher than a melting temperature of the resin before opening a plurality of paths installed so as to be openable and closable and optionally maintaining the resin inside the cavity at a pressure;
injecting resins into the cavity through the plurality of paths;
closing each of the plurality of paths such that the resins injected from each path converge, there being a time difference between when a first path and a second path of the plurality of paths are closed, by which the resin from the first path submerges into the resin from the second path; and
cooling the mold so as to control solidification of at least the resin being injected from the earliest-closed path, wherein the resin has a crystallinity degree of 20% or more after cooling,
wherein closing the paths comprises the steps of:
closing the second path and solidifying the resin while the resin from the first path is maintained at pressure, and
closing the first path after the temperature of the mold falls to a temperature lower than or equal to a heat distortion temperature of the resin.

2. The resin injection molding method according to claim 1, further comprising
maintaining a temperature of the mold in the vicinity of a converged portion of the resins injected from each of the paths in a range from a heat distortion temperature of the resin to a melting point of the resin, during at least a part of a period of time from when each of the paths are closed until a shaped article undergoes solidification of the surface of the shaped article.

3. The resin injection molding method according to claim 1, wherein
the resin injected from each of the paths are crystalline resins.

4. The resin injection molding method according to claim 1, wherein
the solidifying of resin at a predetermined crystallinity degree or more is performed by controlling a cooling speed of the mold.

5. The resin injection molding method according to claim 4, wherein
the cooling speed is controlled by at least one of the manners such as increasing or decreasing a flow rate of a coolant supplied to the mold and raising or lowering a temperature of the coolant.

6. The resin injection molding method according to claim 1, wherein
an angle formed by an extension line on a surface of a shaped article after solidification of the resins and a tangent line at a converged surface in the vicinity of the surface of the shaped article is 25 degrees or less.

7. The resin injection molding method according to claim 1, wherein
a submerged distance of the resins is greater than or equal to a thickness of a shaped article after solidification of the resins at a converged portion.

8. A method for molding resins inside a cavity formed within a mold, the method comprising:
heating the mold to a temperature equal to or higher than a melting temperature of the resin before opening a plurality of paths installed so as to be openable and closable and optionally maintaining the resin inside the cavity at a pressure;
injecting resins into the cavity through the plurality of paths;
closing each of the plurality of paths such that the resins injected from each path converge, there being a time difference between when a first path of the plurality of paths is injected the resin and optionally maintained the resin inside the cavity at pressure which is completed maintaining at pressure and a second path of the plurality of paths is injected the resin and optionally maintained the resin inside the cavity at pressure which is completed maintaining at pressure, by which the resin which has been injected from the first path submerges into the resin which has been injected from the second path; and
cooling the mold so as to control solidification of at least the resin being injected from the path at which injecting the resin and optionally maintaining the resin inside the cavity at pressure which is completed maintaining at pressure earliest, wherein the resin has a crystallinity degree of 20% or more after cooling,
wherein closing the paths comprises the steps of:
completing maintenance of the resin from the second path at pressure by closing the second path,
solidifying the resin while the resin from the first path is maintained at pressure, and
completing the maintenance of the resin from the first path at pressure by closing the first path after the temperature of the mold falls to a temperature lower than or equal to a heat distortion temperature of the resin.

9. The resin injection molding method according to claim 8, further comprising
maintaining a temperature of the mold in the vicinity of a converged portion of the resins injected from each of the paths in a range from a heat distortion temperature of the resin to a melting point of the resin, during at least a part of a period of time from when each of the paths are closed until a shaped article undergoes solidification of the surface of the shaped article.

10. The resin injection molding method according to claim 8, wherein the resin injected from each of the paths are crystalline resins.

11. The resin injection molding method according to claim 8, wherein
the solidifying of resin at a predetermined crystallinity degree or more is performed by controlling a cooling speed of the mold.

12. The resin injection molding method according to claim 11, wherein
the cooling speed is controlled by at least one of the manners such as increasing or decreasing a flow rate of a coolant supplied to the mold and raising or lowering a temperature of the coolant.

13. The resin injection molding method according to claim 8, wherein
an angle formed by an extension line on a surface of a shaped article after solidification of the resins and a tangent line at a converged surface in the vicinity of the surface of the shaped article is 25 degrees or less.

14. The resin injection molding method according to claim 8, wherein
a submerged distance of the resins is greater than or equal to a thickness of a shaped article after solidification of the resins at a converged portion.

15. A method for molding resins inside a cavity formed within a mold, the method comprising:
heating the mold to a temperature equal to or higher than a melting temperature of the resin before opening a plurality of paths installed so as to be openable and closable and optionally maintaining the resin inside the cavity at a pressure;
injecting resins into the cavity through the plurality of paths;
closing each of the plurality of paths such that the resins injected from each path converge, there being a pressure difference between in a first path being maintained the resin at a pressure value and a second path being maintained the resin at a pressure value, by which the resin from the first path maintained in higher pressure value submerges into the resin from the second path maintained in lower pressure value; and
cooling the mold so as to control solidification of at least the resin being injected from the path maintained at a lowest pressure value, wherein the resin has a crystallinity degree of 20% or more after cooling,
wherein closing the paths comprises the steps of:
completing maintenance of the resin from the second path at pressure,
solidifying the resin while the resin from the first path is continuously maintained at the pressure value until the temperature of the mold falls to a temperature lower than or equal to a heat distortion temperature of the resin, and then
closing both the first and second paths.

16. The resin injection molding method according to claim 15, further comprising
maintaining the pressure value of the resin injected from the first path and the pressure value of the resin injected from the second path so as to cause pressure difference between the pressure values of each path of the plurality of paths, after convergence of the resin injected from each of the paths.

17. The resin injection molding method according to claim 15, further comprising
maintaining a temperature of the mold in the vicinity of a converged portion of the resins injected from each of the paths in a range from a heat distortion temperature of the resin to a melting point of the resin, during at least a part of a period of time from when each of the paths are closed until a shaped article undergoes solidification of the surface of the shaped article.

18. The resin injection molding method according to claim 15, wherein the resin injected from each of the paths are crystalline resins.

19. The resin injection molding method according to claim 15, wherein
the solidifying of resin at a predetermined crystallinity degree or more is performed by controlling a cooling speed of the mold.

20. The resin injection molding method according to claim 19, wherein
the cooling speed is controlled by at least one of the manners such as increasing or decreasing a flow rate of a coolant supplied to the mold and raising or lowering a temperature of the coolant.

21. The resin injection molding method according to claim 15, wherein
an angle formed by an extension line on a surface of a shaped article after solidification of the resins and a tangent line at a converged surface in the vicinity of the surface of the shaped article is 25 degrees or less.

22. The resin injection molding method according to claim 15, wherein
a submerged distance of the resins is greater than or equal to a thickness of a shaped article after solidification of the resins at a converged portion.

\* \* \* \* \*